(12) United States Patent  (10) Patent No.: US 9,091,540 B2
Laabs et al.  (45) Date of Patent: Jul. 28, 2015

(54) GEODETIC SURVEYING SYSTEM AND METHOD FOR OPERATING A GEODETIC SURVEYING SYSTEM

(71) Applicant: Trimble Jena GmbH, Jena (DE)

(72) Inventors: Steffen Laabs, Jena (DE); Michael Vogel, Jena (DE)

(73) Assignee: Trimble Jena GmbH, Jena (DE)

( * ) Notice: Subject to any disclaimer, the term of this patent is extended or adjusted under 35 U.S.C. 154(b) by 187 days.

(21) Appl. No.: 13/654,239

(22) Filed: Oct. 17, 2012

(65) Prior Publication Data

US 2013/0096874 A1   Apr. 18, 2013

(30) Foreign Application Priority Data

Oct. 18, 2011  (DE) .................. 10 2011 116 303

(51) Int. Cl.
*G01C 9/00* (2006.01)
*G01C 15/00* (2006.01)

(52) U.S. Cl.
CPC ....................................... *G01C 15/00* (2013.01)

(58) Field of Classification Search
CPC ....................................................... G01C 15/00
USPC .............. 702/151, 154, 150, 92, 93; 73/1.75;
342/357.08, 357.17, 357.14, 357.06
See application file for complete search history.

(56) References Cited

U.S. PATENT DOCUMENTS

| | | | |
|---|---|---|---|
| 5,077,557 A | 12/1991 | Ingensand | |
| 5,233,357 A | 8/1993 | Ingensand et al. | |
| 5,512,905 A | 4/1996 | Nichols et al. | |
| 5,671,160 A * | 9/1997 | Julian | 702/94 |
| 5,760,909 A | 6/1998 | Nichols | |
| 5,949,548 A | 9/1999 | Shirai et al. | |
| 6,384,902 B1 | 5/2002 | Schneider | |
| 6,480,148 B1 * | 11/2002 | Wilson et al. | 342/357.32 |
| 6,633,256 B2 * | 10/2003 | Zhdanov et al. | 342/357.32 |
| 7,634,380 B2 * | 12/2009 | Martin | 702/150 |
| 7,646,339 B2 * | 1/2010 | Green et al. | 342/357.34 |
| 2001/0019101 A1 * | 9/2001 | Ohtomo et al. | 250/206.1 |
| 2006/0021236 A1 | 2/2006 | Endo | |
| 2008/0136267 A1 | 6/2008 | Laabs et al. | |
| 2008/0256812 A1 | 10/2008 | Yandrick et al. | |
| 2009/0231582 A1 | 9/2009 | Aebischer et al. | |
| 2012/0166137 A1 * | 6/2012 | Grasser et al. | 702/150 |

FOREIGN PATENT DOCUMENTS

DE 198 02 379 A1 7/1998
DE 10 2005 024 525 A1 3/2006

(Continued)

*Primary Examiner* — Sujoy Kundu
*Assistant Examiner* — Ricky Ngon
(74) *Attorney, Agent, or Firm* — Kilpatrick Townsend & Stockton LLP (57) ABSTRACT

A geodetic surveying system, comprising: a first measurement unit and a second measurement unit. Each of the first and the second measurement unit is configured to perform a measurement for acquiring positioning data of the respective measurement unit. The system further comprises a first inclinometer for acquiring inclination data of the first inclinometer which represent a vertical inclination measured at the first measurement unit; and a second inclinometer for acquiring inclination data of the second inclinometer, which represent a vertical inclination measured at the second measuring unit. The geodetic surveying system is configured to determine a relative orientation angle between the first inclinometer and the second inclinometer in a horizontal plane relative to a vertical adjustment of the geodetic surveying system, depending on the inclination data of the first inclinometer and the second inclinometer.

18 Claims, 5 Drawing Sheets

(56) References Cited

FOREIGN PATENT DOCUMENTS

| DE | 10 2008 060 798 B3 | 12/2009 |
| DE | 10 2009 047 387 A1 | 6/2011 |
| EP | 403 585 A1 | 1/1990 |
| EP | 423 162 A1 | 1/1990 |
| EP | 1 024 344 A1 | 1/1999 |
| EP | 1 744 122 A2 | 7/2006 |
| WO | WO 2006/097408 A1 | 9/2006 |

* cited by examiner

GEODETIC SURVEYING SYSTEM AND METHOD FOR OPERATING A GEODETIC SURVEYING SYSTEM

CROSS-REFERENCES TO RELATED APPLICATIONS

The present application claims priority of German Patent Application Serial No. 10 2011 116 303.8, filed Oct. 18, 2011 in Germany, entitled "GEODAETISCHES MESSSYSTEM UND VERFAHREN ZUM BETREIBEN EINES GEODAETISCHEN MESSSYSTEMS", the contents of which is hereby incorporated by reference in its entirety.

FIELD

The present disclosure relates to a geodetic surveying system, and a method for operating a geodetic surveying system. In particular, the present disclosure relates to a geodetic surveying system, which comprises a terrestrial surveying instrument as well as an antenna and a receiver for a global navigation satellite system.

BACKGROUND

Nowadays, geodetic surveying methods, which use global navigation satellite systems can reach a sub-centimeter positioning accuracy. This accuracy is in particular achieved by using techniques, such as differential measurement methods or multi-channel receivers. In differential measurement methods, measurements with two devices are conducted simultaneously. Multi-channel receivers can receive signals of multiple satellites.

A further advantage residing in using global navigation satellite systems for geodetic surveying measurements is that no line of sight connection between individual surveying instruments is necessary. Moreover, weather and day time conditions are less critical for such measurements compared to terrestrial measurements of a similar accuracy.

However, reception of signals of a global navigation satellite system can be poor in the intermediate vicinity of obstacles. Examples for such obstacles can be foliage or brickwork structures.

It is therefore advantageous to apply a combination of different surveying techniques, such as a combination of terrestrial surveying techniques with a surveying system using a global navigation satellite system.

SUMMARY

The disclosure provides a geodetic surveying system for efficiently performing a geodetic survey. The disclosure further provides a method for operating such a geodetic surveying system.

Embodiments provide a geodetic surveying system, comprising: a first measurement unit and a second measurement unit; wherein each of the first and the second measurement unit is configured to perform a measurement for acquiring positioning data of the respective measurement unit. The geodetic surveying system further comprises a first inclinometer for acquiring inclination data of the first inclinometer which represent a vertical inclination measured at the first measurement unit; and a second inclinometer for acquiring inclination data of the second inclinometer, which represent a vertical inclination measured at the second measuring unit. The geodetic surveying system is configured to determine a relative orientation angle between the first inclinometer and the second inclinometer in a horizontal plane relative to a vertical adjustment of the geodetic surveying system, depending on the inclination data of the first inclinometer and the second inclinometer.

Thereby, a geodetic surveying system is provided, which allows to acquire information about the orientation of the first measuring unit relative to the second measuring unit.

The geodetic surveying system may for example be composed of a plurality of geodetic measuring units, which are detachably connected to each other. After the measuring units have been separated and connected again, the geodetic surveying system can determine the relative orientation angle between the measuring units in the horizontal plane relative to the vertical adjustment of the geodetic surveying system. The geodetic surveying system may comprise a coupling system, which is configured such that the second measuring unit is detachably coupleable to the first measuring unit. The coupling system may comprise a screw connection, a locking connection and/or a clamping connection. The first and/or the second measuring unit may be configured as a hand-held unit, which is detachably connected to the remaining geodetic surveying system.

The first and/or the second measuring unit may be configured such that their position is adaptable to the requirements of an individual user, such as the body size. After the user has changed the position of at least one of the measuring units, it is possible for the geodetic measuring system to determine the relative orientation angle in the horizontal plane of the first inclinometer relative to the second inclinometer.

The first measuring unit may comprise a satellite surveying system, which is configured for position determination by receiving signals of a global navigation satellite system. The second measuring unit may be a terrestrial surveying instrument, such as a distance measuring system, a theodolite, and/or a total station. The distance measuring system may be an electro-optical distance measuring system, in particular a laser distance measuring instrument. The geodetic coordinates may be determinable depending on the positioning data. Examples for positioning data are: a distance of the distance measuring system from a target, a horizontal angle of the target, a vertical angle of the target, position and/or altitude data of the survey point, which are acquired by the satellite surveying system.

By determining the relative orientation angle between the first inclinometer and the second inclinometer, it is possible to relate the positioning data of the first measuring unit and the positioning data of the second measuring unit to a common coordinate system. By way of example, the first measuring unit is a satellite surveying system and the second measuring unit is a terrestrial surveying system. Thereby, a position and an orientation of the local coordinate system relative to the global coordinate system can be determined based on the relative orientation angle.

Furthermore, it is possible to increase the positioning accuracy of one of the measuring units by using the inclination data of both inclinometers. By way of example, the first inclinometer measures the vertical inclination of a pole or of a tripod of the geodetic surveying system, whereas the second inclinometer measures the vertical inclination of a distance measuring axis of a distance measuring system, which is connected to the pole or to the tripod. Based on the determined relative orientation angle, it is possible to correct the measured distances of the distance measuring system depending on the measured inclination of the tripod or pole. Thereby, accurate distance measurements may be obtained, even at imperfect vertical adjustments of the pole or tripod.

The first and/or the second inclinometer may be a two-axis inclinometer. The first and the second measuring axes may define a measuring plane. The first and the second measuring axes may be oriented perpendicular to each other.

The first and/or the second inclinometer may be an electronic accelerometer. In particular, the inclinometer may be a micro-electromechanical (MEMS) accelerometer. The micro-electromechanical accelerometer may be a spring-mass system, which comprises one or more silica webs representing "springs", each having a width of several micrometers. The mass may also be composed of silica.

The first and/or the second inclinometer may be configured as a liquid-level tilt sensor. The liquid-level tilt sensor may be configured such that an inclination of a surface of a liquid, such as a liquid-air surface, is measured relative to the remaining tilt sensor. The liquid-level tilt sensor may comprise an electrical or electronic detector. The liquid-level tilt sensor may be configured such that a laser beam is reflected at the surface of the liquid and the reflected beam is detected by a position sensitive detector. The position sensitive detector may comprise a CMOS sensor or a CCD sensor. An exemplary embodiment of a liquid-level tilt sensor, is disclosed in U.S. Pat. No. 7,388,658 B2, the contents of which is incorporated herein by reference in its entirety.

The inclination data may represent an inclination angle and/or an inclination direction of the measuring plane of the inclinometer. The inclination angle may be defined as an inclination angle of the measuring plane of the inclinometer relative to the gravitational horizontal plane (i.e. a plane oriented perpendicular to the gravity vector). The inclination direction may be defined as a unit vector in the gravitational horizontal plane, wherein the inclination direction is oriented in a direction of the gradient of the measuring plane relative to the gravitational horizontal plane. The inclination data of the first and the second inclinometer represent a measurement of the vertical inclination of the respective measuring unit. The vertical inclination of the measuring unit may for example be obtained depending on a calibration of the inclination data. The calibration establishes a relation between the inclination angle and the inclination direction of the inclinometer and the inclination angle and the inclination direction of the measuring unit.

The first and the second inclinometer may be of an identical design. Thereby, it is possible to directly compare the inclination data of the first inclinometer with the inclination data of the second inclinometer. Alternatively, before comparing the inclination data of the first inclinometer with the inclination data of the second inclinometer, a function is applied to the inclination data, such that the transformed inclination data are comparable. By way of example, a measurement range of the first inclinometer can be different from a measurement range of the second inclinometer and the function corrects for the different measurement ranges.

A rigid body has six degrees of freedom of movement. The six degrees of freedom of movement are, for example, expressed by three coordinate values of translation and three rotation angle values. Under translation, all points of the rigid body move by the same translation vector. The three coordinate values of translation together define the position of the rigid body. Under rotation, all points of the rigid body are rotated by an angle about a rotation axis. The three rotation angles define the orientation of the rigid body. The orientation of the rigid body may be expressed by yaw, pitch and roll or by Eulerian angles.

The relative orientation angle is located in the horizontal plane. The horizontal plane is defined relative to a vertical adjustment of the geodetic surveying system. In other words, the relative orientation angle is measured in a plane, which corresponds to the horizontal plane at a vertical adjustment of the geodetic surveying system. The vertical adjustment may be a standard orientation or reference orientation, in which geodetic measurements are performed. The relative orientation angle may for example be an angle between a projection of the first measuring axis of the first inclinometer onto the horizontal plane and a projection of the first measuring axis of the second inclinometer onto the horizontal plane.

According to a further embodiment, the geodetic surveying system is configured to determine the relative orientation angle between the first inclinometer and the second inclinometer in the horizontal plane depending on inclination data of the first and the second inclinometer, wherein the inclination data are acquired in at least two different orientations of the geodetic surveying system.

The at least two different orientations of the geodetic surveying systems may be two different orientations relative to the direction of gravity. The at least two orientations may be selected such that they are not convertible into one other by a rotation of the geodetic surveying system about an axis, which is parallel to the direction of a gravity.

According to a further embodiment, the geodetic surveying system is further configured to determine a reference direction in the horizontal plane, relative to the vertical adjustment of the geodetic surveying system, depending on the inclination data of the first inclinometer and/or the inclination data of the second inclinometer at the at least two different orientations. The geodetic surveying system may further be configured to determine an orientation angle of the first inclinometer in the horizontal plane relative to the reference direction. Furthermore, the geodetic surveying system may be configured to determine an orientation angle of the second inclinometer in the horizontal plane relative to the reference direction.

According to an embodiment, the geodetic surveying system is further configured to acquire inclination data of the first inclinometer and inclination data of the second inclinometer in a first and in a second orientation of the geodetic surveying system. An orientation of the first inclinometer relative to the second inclinometer in the first orientation may be identical to an orientation of the first inclinometer relative to the second inclinometer in the second orientation. The geodetic surveying system may further be configured to determine the relative orientation angle depending on the inclination data of the first and the second inclinometer in the first and in the second orientation.

Thereby, a geodetic surveying system is provided, which allows a simple and fast determination of the relative orientation angle. The geodetic surveying system may perform a translational movement simultaneously with the variation of the orientation of the geodetic surveying system from the first orientation to the second orientation.

The second orientation relative to the first orientation may be such that for the first and/or the second measuring axis of the first and/or the second inclinometer, an absolute difference between the vertical inclinations of the measuring axis in the first and in the second orientation exceeds a minimum angle. The minimum angle may for example be 5 degrees or 10 degrees or 15 degrees. Alternatively, the second orientation relative to the first orientation may be such that for the measuring plane of the first and/or the second inclinometer, an absolute difference between the vertical inclination angles of the measuring plane in the first and in the second orientation is greater than 5 degrees, greater than 10 degrees or greater than 15 degrees.

According to a further embodiment, the geodetic surveying system is configured to acquire inclination data of the first inclinometer and the second inclinometer at a plurality of orientations of the geodetic surveying system and to select the inclination data of the first inclinometer and the second inclinometer in the first and in the second orientation from the acquired inclination data, which have been acquired at the plurality of orientations.

Thereby, a geodetic surveying system is provided, which allows for example to determine the inclination data of the first orientation and the second orientation during the process of surveying. The geodetic surveying system may be configured to select the first and the second orientation such that an error in determining the relative orientation angle is as small as possible.

According to a further embodiment, the determining of the relative orientation angle further comprises: determining for each of the first and the second inclinometer a change or difference of the inclination data of the respective inclinometer between the first and the second orientation.

The determining of the change may comprise applying a function to the inclination data of the first orientation and the inclination data of the second orientation. Thereby, function values may be determined, which represent the change of the orientation. For example, the change of the inclination data may comprise determining a difference between a value of the inclination data of the first orientation and the corresponding value of the inclination data of the second orientation. The value of the inclination data may for example be an inclination of a first or a second measuring axis of the inclinometer. The geodetic surveying system may be configured such that depending on the change of the inclination data, a reference direction in the horizontal plane relative to a vertical adjustment of the geodetic surveying system is determinable.

According to a further embodiment, for the determining of the relative orientation angle, the geodetic surveying system is further configured to determine an orientation angle of the first inclinometer in the horizontal plane relative to the vertical adjustment of the geodetic surveying system, depending on a change between the inclination data of the first inclinometer in the first orientation and the inclination data of the first inclinometer in the second orientation. The geodetic surveying system may further be configured to determine an orientation angle of the second inclinometer in the horizontal plane, relative to the vertical adjustment of the geodetic surveying system, depending on a change between the inclination data of the second inclinometer in the first orientation and the inclination data of the second inclinometer in the second orientation.

The change between the inclination data in the first orientation and the inclination data in the second orientation may be a difference between the inclination data in the first orientation and the inclination data in the second orientation. The orientation angle of the first inclinometer and/or the second inclinometer may be an orientation angle relative to a reference direction. The geodetic surveying system may be configured such that the reference direction is determinable depending on the inclination data of the first and/or the second inclinometer.

According to a further embodiment, the geodetic surveying system is further configured to determine the relative orientation angle depending on a comparison or difference between the determined orientation angle of the first inclinometer in the horizontal plane and the determined orientation angle of the second inclinometer in the horizontal plane.

According to a further embodiment, the geodetic surveying system is further configured to determine geodetic coordinates depending on the relative orientation angle and further depending on the positioning data of the first measuring unit and/or the positioning data of the second measuring unit.

Thereby, it is for example possible to merge and/or supplement the positioning data of the first measuring unit with the positioning data of the second measuring unit. Thereby, a higher accuracy is achievable in determining the geodetic coordinates.

The geodetic coordinates may be geodetic coordinates of a survey point. A survey point may be a position of the geodetic surveying system or an target point of the geodetic surveying system. At the target point, a target may be arranged.

According to a further embodiment, the geodetic surveying system is configured to determine a position and an orientation of a coordinate system of the positioning data of the first measuring unit relative to a coordinate system of the positioning data of the second measuring unit depending on the relative orientation angle.

According to a further embodiment, the first measuring unit comprises an antenna and a receiver for a global navigation satellite system. Additionally or alternatively, the second measuring unit comprises a terrestrial surveying instrument.

Thereby, it is for example possible to match or supplement the positioning data, which are acquired by using signals of navigation satellites with positioning data, which have been acquired with the terrestrial measuring instrument. Thereby, it is possible to determine the position and the orientation of the local coordinate system relative to a global coordinate system depending on the relative orientation angle.

The terrestrial surveying instrument may comprise a distance measuring system, a theodolite, a tachymeter and/or a total station.

Embodiments provide a method of operating a geodetic surveying system, wherein the geodetic surveying system comprises a first inclinometer for acquiring inclination data of the first inclinometer for two measuring axes of the first inclinometer; and wherein the geodetic surveying system comprises a second inclinometer for acquiring inclination data for two measuring axes of the second inclinometer. The method may comprise: arranging the geodetic surveying system in a first orientation; acquiring inclination data of the first and the second inclinometer in the first orientation; arranging the geodetic surveying system in a second orientation; acquiring inclination data of the first and the second inclinometer in the second orientation. In the first orientation, an orientation of the first inclinometer relative to the second inclinometer may be identical as in the second orientation. The method may further comprise determining a relative orientation angle between the first inclinometer and the second inclinometer in a horizontal plane relative to a vertical adjustment of the geodetic surveying system depending on the inclination data of the first and the second inclinometer in the first and in the second orientation. The method may further comprise determining geodetic coordinates by the geodetic surveying system depending on the relative orientation angle.

The features and advantages which have been described in regard to the geodetic surveying system, if applicable, apply to the method of operating the geodetic surveying system and vice versa.

According to a further embodiment, the determining of the relative orientation angle comprises acquiring inclination data of the first and the second inclinometer at at least two mutually different orientations of the geodetic surveying system.

According to a further embodiment, the determining of the relative orientation angle further comprises determining a reference direction in the horizontal plane, the horizontal plane being relative to a vertical adjustment of the geodetic surveying system; wherein the determining of the reference direction is performed depending on the inclination data of the first and/or the second inclinometer.

According to a further embodiment, the determining of the relative orientation angle further comprises determining an orientation angle of the first inclinometer in the horizontal plane, the horizontal plane being relative to a vertical adjustment of the geodetic surveying system and the orientation angle being relative to the reference direction. The embodiment may further comprise determining an orientation angle of the second inclinometer in the horizontal plane, the horizontal plane being relative to a vertical adjustment of the geodetic surveying system and the orientation angle being relative to the reference direction.

According to an embodiment, the method further comprises: determining an inclination angle of a measuring plane of the first inclinometer relative to a measuring plane of the second inclinometer. Additionally or alternatively, the method further comprises determining an inclination direction of the measuring plane of the first inclinometer relative to the measuring plane of the second inclinometer. Each of the inclination angle and the inclination direction may be determined depending on the inclination data of the first and the second inclinometer in the first and/or the second orientation, and/or depending on the relative orientation angle.

According to a further embodiment, the method further comprises adjusting the first measuring unit relative to the second measuring unit depending on a relative orientation angle.

Embodiments provide a geodetic surveying system, comprising: a distance measurement system for a distance measurement in a measurement position of the distance measurement system along a distance measurement axis of the distance measurement system to a target, which is arranged at a distance from the geodetic surveying system. The geodetic surveying system may further comprise a base component which is connected to the distance measurement system via an articulate connection of the geodetic surveying system. The base component may comprise: a reference point, which is arrangeable at a survey point; and a surface region, which is configured as a target area for the distance measurement system. The articulate connection may be configured such that the distance measurement system is arrangeable such that the distance measurement axis connects the distance measurement system with the surface region along a straight line. The measurement position of the distance measurement system relative to the reference point may be determinable depending on a measurement of the distance to the surface region by the distance measurement system.

Thereby, a geodetic surveying system is provided, which allows to determine a position of the distance measuring system relative to the reference point with a high accuracy.

The measuring position may be defined as a position relative to the base component, in which the distance measuring system performs a distance measurement to a target, which is arranged at a distance from the geodetic surveying system. The base component may comprise a tripod, a pole, an antenna housing and/or a flat head.

The articulate connection may comprise one or more joints. For example, the articulate connection may comprise a ball joint and/or a swivel axis. The articulate connection may be configured such that by operating the articulate connection, the distance measuring system is arrangeable such that the distance measuring axis connects the distance measuring system with the surface region along a straight line. The articulate connection may be configured such that the vertical angle of the distance measuring axis is variable. The articulate connection may be configured such that the distance measuring axis is rotated about a point.

The distance measuring axis connects the distance measuring system with the surface region along a straight line. The straight line may a single straight line, i.e. without being curved or angled. The expression "between the distance measuring system and the surface region" may be defined as between the optical component of the distance measuring system at which the laser beam leaves the distance measuring system and the surface region. During the distance measurement to the target, which is arranged at a distance from the geodetic surveying system, the laser beam also leaves the distance measuring system at this optical component.

The distance measuring system may be an electro-optical distance measuring system, in particular a laser distance measuring device. The distance measuring axis may be an axis of the laser beam. The distance measuring system may be part of a tachymeter or a total station of the geodetic surveying system.

The base component may comprise a pole, a tripod and/or an antenna housing. The geodetic surveying system may comprise a coupling system, which is configured such that the distance measuring system is detachably connectable to the base component of the geodetic surveying system. The coupling system may comprise a screw connection, a locking connection and/or a clamping connection. The geodetic surveying system may be configured such that the distance measuring system is connectable to the base component at different positions relative to the reference point. Thereby, the distance measuring system is adaptable to the requirements of a user, such as a body size. The geodetic surveying system may comprise a guide rail system, which is configured such that the distance measuring system is slidably displaceable along a guide rail of the guide rail system.

The reference point may be a portion of the geodetic surveying system, which is arrangeable at the survey point. For example, the reference point may be a tip of a pole.

Alternatively, the reference point may be a spatial region, which has a constant position relative to the base component. The base component may be adjustable or positionable such that the reference point coincides with the survey point. By way of example, the base component may comprise a tripod and a flat head, wherein the flat head is adjustable relative to the survey point.

The surface region comprises a reflective region and/or a target mark. The reflective region may comprise a reflector and/or a reflector foil. The surface region may be configured such that an impingement location of the light beam of the distance measuring system is visible on the surface region. By way of example, the user adjusts the orientation of the distance measuring system such that an illumination spot of the distance measuring system is located at a center of the target mark.

According to an embodiment, the geodetic surveying system is configured such that the measuring position of the distance measuring system is determinable relative to the reference point depending on the determined distance between the distance measuring system and the surface region.

According to an embodiment, the geodetic surveying system is configured such that the distance measuring system is connected with the reference point and/or the surface region of the base component. By way of example, the reference point is a portion of the geodetic surveying system, such as the tip of a pole, and the distance measuring system is connected via the pole to the reference point.

The geodetic surveying system may be configured such that the distance measuring system is detachably connected to the base component. The geodetic surveying system may comprise a coupling system for connecting the distance measuring system to the base component.

According to a further embodiment, the articulate connection comprises at least one swivel joint, which is configured such that a swiveling movement of the distance measuring system directs the distance measuring axis away from the target, which is arranged at a distance from the geodetic surveying system and onto the surface region. By way of example, the swivel joint may comprise one or more swivel axes.

According to a further embodiment, the base component comprises an antenna housing, wherein the antenna housing comprises the surface region. Thereby, a geodetic surveying system is provided, wherein the antenna housing is used to determine the position of the distance measuring system relative to the reference point. In the antenna housing, the antenna of a satellite geodetic surveying system and/or the receiver of the satellite geodetic surveying system may be arranged.

According to a further embodiment, the base component comprises a pole; wherein the reference point is arranged at a first end of the pole; and/or wherein the base component comprises an antenna housing, which is arranged at a second end of the pole; wherein the antenna housing comprises the surface region or the surface region is located at the antenna housing.

By way of example, the pole may have a length of between 1.70 m and 2.20 m. The surface region may be located at a portion of a surface of the antenna housing, which faces the distance measuring system.

The structures of the embodiments described above need not be implemented strictly as they are described as separate embodiments, but the features of different embodiments may be freely combined together.

BRIEF DESCRIPTION OF THE DRAWINGS

The forgoing as well as other advantageous features will be more apparent from the following detailed description of exemplary embodiments with reference to the accompanying drawings. It is noted that not all possible embodiments necessarily exhibit each and every, or any, of the advantages identified herein.

DETAILED DESCRIPTION OF EXEMPLARY EMBODIMENTS

Figure 1:
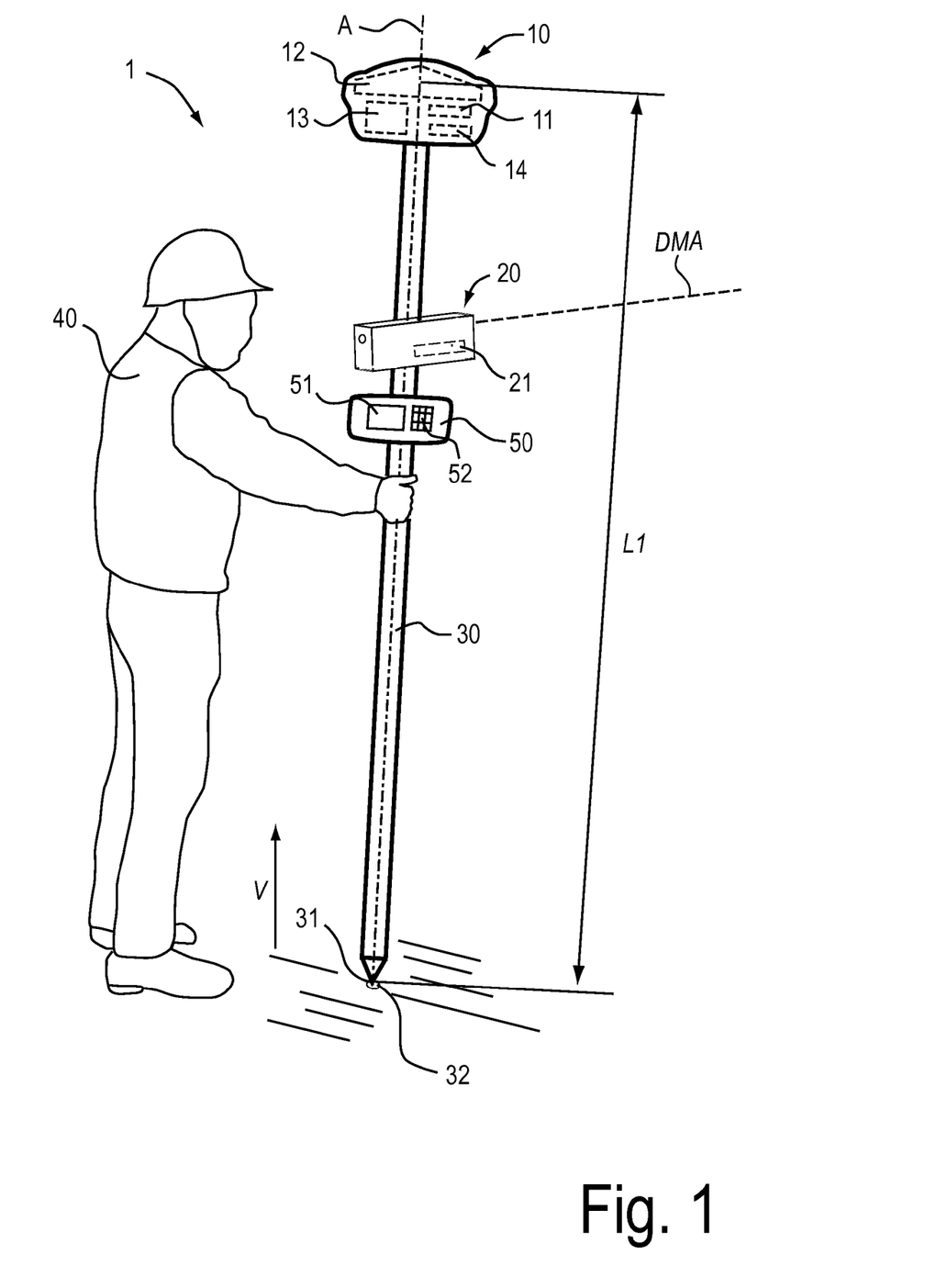
FIG. 1 shows a schematic illustration of a geodetic surveying system according to a first exemplary embodiment.

FIG. 1 shows a geodetic surveying system 1 according to a first exemplary embodiment. The geodetic surveying system 1 comprises a satellite surveying system 10 as a first measuring unit. The satellite surveying system is configured to receive signals from satellites of a global navigation satellite system (GNSS) and to generate positioning data depending on these signals. Depending on the positioning data, geodetic coordinates of a survey point are determinable. The survey point may be a position 32 at which a reference point 31 of a geodetic surveying system 1 is arranged. Alternatively, the survey point may be a target point, which is arranged at a distance from the geodetic surveying system 1.

The satellite surveying system 10 comprises an antenna 12 and a receiver 13. The satellite surveying system 10 is arranged at a first end of a pole 30 such that the satellite surveying system 10 and the pole 30 have a constant position and orientation relative to each other. By way of example, the pole 30 has a length of between 1.70 m and 2.20 m. At a second end of the pole, a reference point 31 of the geodetic surveying system 1 is arranged. The reference point 31 is contactable to a survey point 31 for performing surveying.

In order to perform surveying, the user 40 must hold the geodetic surveying system 1 in an orientation, which deviates from a vertical adjustment by less than 10 degrees or less than 5 degrees or less than 1 degree or less than 0.5 degrees. The vertical adjustment may be defined as a standard orientation of the geodetic surveying system for performing a measurement for determining positioning data. The vertical adjustment may be a vertical adjustment of the first and/or the second measuring unit. In the geodetic surveying system 1 shown in FIG. 1, the vertical adjustment of the geodetic surveying system is defined by a vertical orientation of an axis A of the pole 30 (i.e. along the zenith vector V or along the gravity vector). In the vertical orientation, the horizontal position of a point which is measured by the antenna 12 corresponds to the horizontal position of the reference point 31. Thereby, it is possible to determine the geodetic coordinates of the survey point 32 depending on the positioning data of the satellite surveying system 10.

The geodetic surveying system 1 comprises a first inclinometer 11 which is configured to measure an inclination angle and an inclination direction of the pole 30. Depending on the determined inclination angle and the known distance L1 of the antenna 12 from the reference point 31, an absolute value of a distance in the gravitational horizontal plane between the horizontal position of the antenna 12 and the horizontal position of the reference point 32 is determinable.

The geodetic surveying system 1 further comprises an azimuth sensor 14, which is configured to determine a geographic north direction and/or a grid north direction. Thereby, it is possible to determine a direction between the horizontal position of the antenna 12 and the horizontal position of the reference point 32 relative to the geographic north direction or relative to the grid north direction. Alternatively, the antenna 12 and the receiver may be configured such that a grid north direction and/or a geographic north direction is determinable depending on the received satellite signals.

The satellite geodetic system 10 is configured such that positioning data are acquired and depending on the positioning data, geodetic coordinates are determinable. The calculation of the geodetic coordinates may be performed by an evaluation and storage unit 50 of the geodetic surveying system 1. Additionally or alternatively, the positioning data may be transmitted to a central unit (not illustrated), which calculates the geodetic coordinates.

Depending on the azimuthal orientation, the data of the azimuth sensor 14 and the inclination data of the first inclinometer 11, the geodetic coordinates can be calculated, wherein the geodetic coordinates are corrected for the deviation of the orientation of the pole 30 from a vertical orientation, which is the standard orientation of the geodetic surveying system. Thereby, a more accurate determination of the geodetic coordinates is possible and/or the measurement can be performed in a very short time, since the pole 30 does not have to be arranged in an exact vertical orientation for surveying.

The geodetic surveying system 1 further comprises a terrestrial surveying instrument as a second measuring unit. In the exemplary embodiment shown in FIG. 1, the terrestrial surveying instrument is a distance measuring system 20, for example an electro-optical distance measuring system, which is configured to determine a distance along a distance measuring axis DMA to a target (not illustrated), which is arranged at a distance from the geodetic surveying system 1. At the target, the light, traveling along the distance measuring axis is reflected. The distance measuring system 20 may be configured to perform distance measurements without a reflector. Alternatively, the target comprises a reflector.

The distance measuring system 20 is arranged at the pole 30 between the reference point 31 and the satellite surveying system 10. The distance measuring system 20 may be configured as a hand-held unit, which is detachable from the pole 30 by the user 40. By way of example, in areas, in which an undisturbed reception of signals of the navigation satellites by the satellite geodetic system 10 is possible, surveying may be performed without using the distance measuring system 20.

The geodetic surveying system 1 comprises a second inclinometer 21, which is configured to measure a vertical inclination of the distance measuring axis. By way of example, depending on the vertical inclination of the distance measuring axis DMA, a height difference between the target object and the distance measuring system 20 can be determined.

The geodetic surveying system 1 is configured to determine a relative orientation angle between the first inclinometer 11 and the second inclinometer 21 in the horizontal plane relative to a vertical adjustment of the geodetic surveying system 1. The relative orientation angle may be given by one angle. The relative orientation angle may be a turning angle about the vertical axis relative to the vertical adjustment of the geodetic surveying system 1.

By determining the relative orientation angle of the first inclinometer 11 relative to the second inclinometer 21 in the horizontal plane, it is possible to determine a position and an orientation of the local coordinate system relative to the global coordinate system. The positioning data of the distance measuring system 20 relate to the local coordinate system. The positioning data of the satellite geodetic system 10 relate to the global coordinate system.

An evaluation and storage unit 50 is in signal communication with the satellite geodetic system 10, the azimuth sensor 14 and the distance measuring system 20. The evaluation and storage unit 50 receives data from these components and stores the data in a storage (not shown) of the evaluation and storage unit 50. The evaluation and storage unit 50 is further configured to evaluate the received data and to display corresponding results to the user on the display 51. Via the keyboard 52, the user can enter commands and/or data, for example for configuring the geodetic surveying system 1.

Figure 2:
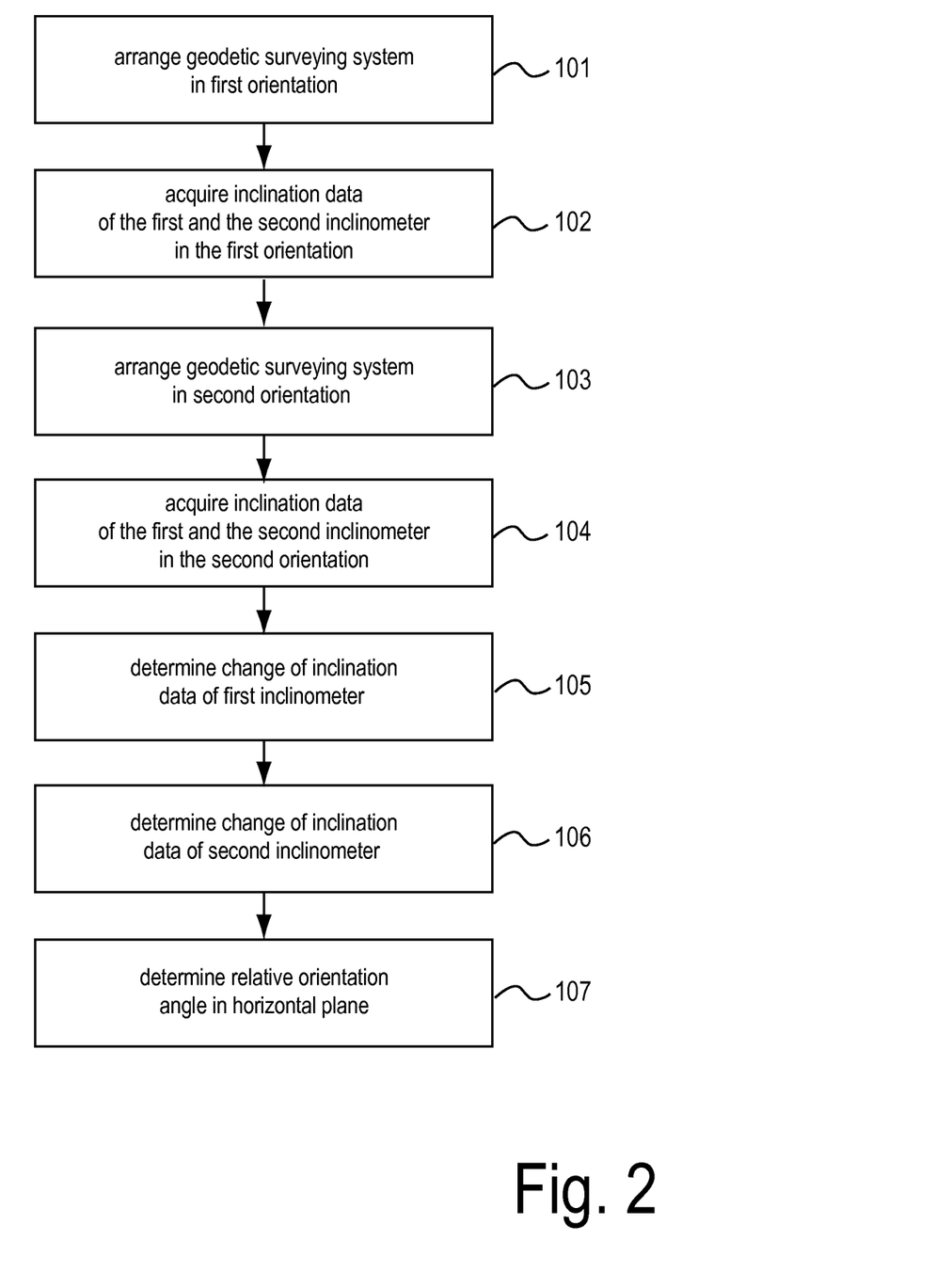
FIG. 2 is a flow-chart of an exemplary method for operating the geodetic surveying system.

FIG. 2 is a flow-chart of an exemplary method for operating the geodetic surveying system 1 shown in FIG. 1. The user arranges 101 the geodetic surveying system 1 in a first orientation. The first orientation can for example be freely selected within the measuring range of the first and the second inclinometer 11, 21 (shown in FIG. 1). Alternatively, the first orientation may be selected such that the first inclinometer 11 measures an absolute value of the inclination angle in the first orientation, which is below a predetermined threshold value, such as for example 15 degrees, 10 degrees or 5 degrees or 2 degrees or 1 degree. After the user inputs a start command via the keyboard, the geodetic surveying system acquires 102 inclination data of the first and the second inclinometer in the first orientation.

Then, the user arranges 103 the geodetic surveying system 1 in a second orientation. The second orientation is different from the first orientation. Also, the second orientation can be freely selected within the measurement ranges of the first and the second inclinometers 11, 21.

Alternatively, the second orientation may be selected such that for the first and/or the second measurement axis of the first and/or the second inclinometer 11, 21, the absolute difference between the inclinations of the first orientation and the second orientation is greater than a minimum angle. The minimum angle may for example be 15 degrees, 10 degrees or 5 degrees. As a result of such a minimum angle, an error in the determining of the relative orientation angle in the horizontal plane is kept small.

In the second orientation, inclination data of the first and the second inclinometer 11, 21 are acquired 104. Then, a change of the inclination data of the first inclinometer 11 between the first orientation and the second orientation is determined 105. Then, a change of the inclination data of the second inclinometer 21 between the first orientation and the second orientation is determined 106. Each of the changes is determined by the evaluation unit. Depending on the determined changes, the relative orientation angle between the first inclinometer 11 and the second inclinometer 21 in the horizontal plane relative to the vertical adjustment of the geodetic surveying system 1 is performed by the evaluation unit.

The geodetic surveying system 1 may be configured such that inclination data of the first inclinometer 11 and the second inclinometer 21 are acquired in a plurality of orientations. From the plurality of orientations, the first and the second orientation are selected depending on the inclination data acquired in the plurality of orientations.

Thereby, the geodetic surveying system 1 may be configured such that determination of the relative orientation angle in the horizontal plane is performed during surveying.

Figure 3:
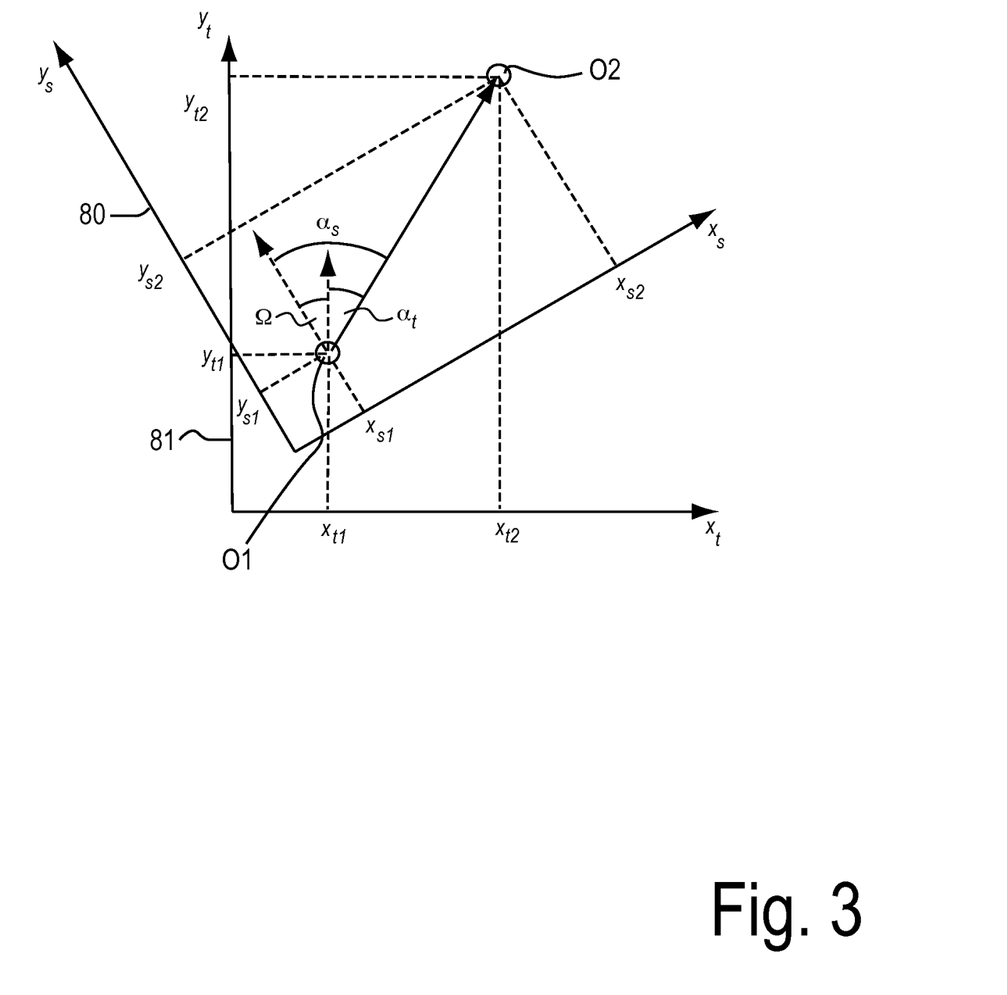
FIG. 3 is a schematic illustration which shows the how the relative orientation angle in the horizontal plane is determined depending on the inclination data of the first inclinometer and the inclination data of the second inclinometer.

FIG. 3 schematically shows, how the horizontal orientation angle in the horizontal plane relative to the vertical adjustment of the geodetic surveying system 1 is determined depending on the inclination data of the first inclinometer 11 (shown in FIG. 1) and the inclination data of the second inclinometer 21 (shown in FIG. 1).

A first coordinate system 80, shown in FIG. 3, represents the inclination data of the first inclinometer 11 and a second coordinate system 81 represents the inclination data of the second inclinometer 21. The inclination data may for example be data values of an electronic accelerometer. Each of the coordinate axes represents a measuring axis of the respective inclinometer. Thereby, the coordinates of a point relative to a coordinate system represent an inclination angle and an inclination direction of the inclinometer, represented by the coordinate system.

By calibrating the first inclinometer 11, it is possible to determine a point of the first coordinate system 80, which corresponds to a vertical orientation of the pole 30, i.e. an orientation of the pole 30, in which the axis A of the pole 30 is vertically oriented. This point can be located at a distance from the origin of the first coordinate system 80.

By determining this point, which represents the vertical adjustment of the geodetic surveying system 1, a vertical inclination of the pole 30 can be determined from the inclination data of the first inclinometer 11.

The vertical adjustment of the geodetic surveying system 1 corresponds to the vertical alignment of the axis A of the pole 30. The paper plane of FIG. 3 corresponds to the horizontal plane relative to the vertical adjustment of the geodetic surveying system 1. Each of the coordinate systems 80, 81, which are shown in FIG. 3, represent a projection of the measuring plane of the respective inclinometer onto the horizontal plane. The measuring plane of an inclinometer is defined by the first and the second measuring axis of the inclinometer.

The first and the second inclinometer 11, 21 are skewed relative to each other in the horizontal plane relative to the vertical adjustment of the geodetic surveying system. Therefore, for example, the Y-coordinate axis of the first coordinate system 80 and the Y-coordinate axis of the second coordinate system 81 form an angle, which corresponds to a relative orientation angle between the first and the second inclinometer in the horizontal plane. Furthermore, the measuring plane of the first inclinometer 11 has an inclination relative to the measuring plane of the second inclinometer 21. Therefore, the origin of the first coordinate system 80 is located at a distance from the origin of the second coordinate system 81.

In each of the coordinate systems, a point represents inclination data values of an orientation of the inclinometer relative to the vertical direction. The absolute value of the vector to the point represents the inclination angle of the inclinometer. The direction of the vector represents the inclination direction of the inclinometer.

The inclination data values, which are acquired by the first and the second inclinometer in the first orientation of the geodetic surveying system (as described with reference to FIG. 2) are marked in FIG. 3 with a circle, denoted by reference sign O1. The inclination data values, which are acquired in the second orientation of the geodetic surveying system, are marked with a circle denoted by reference sign O2.

In the coordinate system 81 of the second inclinometer, the angle $\alpha_t$ may be defined relative to a connecting line connecting the inclination data values of the first orientation with the inclination data values of the second orientation:

$$\alpha_t = \arctan\left(\frac{x_{t2} - x_{t1}}{y_{t2} - y_{t1}}\right),$$

wherein $x_{t1}$ is the measurement value of the first measuring axis in the first orientation, $x_{t2}$ is the measuring value of the first measuring axis in the second orientation, $y_{t1}$ is the measurement value of the second measuring axis in the first orientation and $y_{t2}$ is the measurement value of the second measuring axis in the second orientation.

The angle $\alpha_t$ represents an orientation angle of the second inclinometer in the horizontal plane (relative to a vertical adjustment of the geodetic surveying system). The angle at $\alpha_t$ is determined depending on a change of the inclination data of the second inclinometer 21 between the first and the second orientation. The change of the inclination data of the second inclinometer 21 between the first and the second orientation defines a reference direction in the horizontal plane (relative to a vertical adjustment of the geodetic surveying system). The angle $\alpha_t$ represents the orientation angle of the second inclinometer 21 relative to the reference direction.

Accordingly, in the coordinate system of the first inclinometer, the angle $\alpha_s$ may be defined:

$$\alpha_s = \arctan\left(\frac{x_{s2} - x_{s1}}{y_{s2} - y_{s1}}\right),$$

wherein $x_{s1}$ is the measurement value of the first measuring axis in the first orientation, $x_{s2}$ is the measurement value of the first measuring axis in the second orientation, $y_{s1}$ is the measurement value of the second measuring axis in the first orientation and $y_{s2}$ is the measurement value of the second measuring axis in the second orientation.

The angle $\alpha_s$ represents an orientation angle of the first inclinometer 11 in the horizontal plane (relative to the vertical adjustment of the geodetic surveying system). The angle as $\alpha_s$ determined depending on a change of the inclination data of the first inclinometer 11 between the first and the second orientation. Here, also a reference direction is defined by the change of the inclination data of the first inclinometer 11 between the first and the second orientation. This reference direction corresponds to the reference direction, which is determined for the second inclinometer 21.

In case the inclination angle of the measuring plane of the first inclinometer 11 relative to the measuring plane of the second inclinometer 21 is small, the relative orientation angle $\Omega$ can be calculated according to the following equation.

$$\Omega = \alpha_s - \alpha_t,$$

i.e. the relative orientation angle $\Omega$ between the first inclinometer 11 and the second inclinometer 21 in the horizontal plane (relative to the vertical adjustment of the geodetic surveying system) is calculated as the difference between the determined orientation angle of the first inclinometer in the horizontal plane and the determined orientation angle of the second inclinometer in the horizontal plane.

The geodetic surveying instrument may be configured such that a relative inclination angle of the measuring plane of the first inclinometer relative to the measuring plane of the second inclinometer is smaller than 20 degrees or smaller than 10 degrees or smaller than 5 degrees or smaller than 2 degrees or smaller than one degree.

A prerequisite for determining the relative orientation angle $\Omega$ in this way is that the orientation of the second inclinometer 21 relative to the first inclinometer 11 in the first and in the second orientation are identical. By verifying the equation $$(x_{t2}-x_{t1})^2+(y_{t2}-y_{t1})^2=(x_{s2}-x_{s1})^2+(y_{s2}-y_{s1})^2,$$

it is possible to check, whether the orientation of the second inclinometer 21 relative to the first inclinometer 11 in the first an in the second orientation are identical. This check may for example be performed by the evaluation and storage unit 50 immediately after the relative orientation angle $\Omega$ has been determined.

Each of the first and the second inclinometer 11, 21 may be configured such that the inclination angle can be determined by the respective inclinometer with an accuracy of better than 0.5 degrees. Furthermore, each of the inclinometers may be configured such that an inclination direction can be determined with an accuracy of better than 0.57 degrees. With inclinometers having these accuracies, the determining of the relative orientation angle in the horizontal plane can be performed with an accuracy of better than 0.8 degrees, when for each of the measuring axes, an absolute difference between the inclinations of the first and the second orientation is 15 degrees or more.

The determining of the relative orientation angle $\Omega$ in the horizontal plane may be automatically performed by the evaluation and storage unit 50. Therefore, when the distance measuring system 10 is disconnected from the pole 30 and reconnected at the later point in time, the relative orientation angle of the first inclinometer 11 relative to the second inclinometer 22 can fast and reliably be determined by the calibration method described above.

After the determining of the relative orientation angle Ω in the horizontal plane, the inclination data of the first inclinometer 11 and the inclination data of the second inclinometer 21 can be calibrated such that the coordinate axis of the first coordinate system 80 is oriented parallel to the corresponding coordinate axis of the second coordinate system 81. This can be performed with a sufficient accuracy, in particular when an inclination angle of the measuring plane of the first inclinometer 11 relative to the measuring plane of the second inclinometer 21 is lower than 15 degrees or lower than 10 degrees or lower than 5 degrees.

After the calibration of the inclination data of the first inclinometer 11 and the second inclinometer 21 depending on the determined relative orientation angle, a distance vector between the origins of the first coordinate system 80 and the second coordinate system 81 can be determined. The coordinate axes of the calibrated first coordinate system are then oriented parallel to the corresponding coordinate axes of the calibrated second coordinate system. The distance vector can be determined depending on the difference between calibrated inclination data of the first inclinometer 11 and calibrated inclination data of the second inclinometer 21, which correspond to a common inclination measurement. The determined distance vector represents the inclination angle and the inclination direction of the measuring plane of the first inclinometer relative to the measuring plane of the second inclinometer. Thereby, an inclination angle and the inclination direction of the measuring plane of the first inclinometer 11 relative to the measuring plane of the second inclinometer 21 can be determined.

Furthermore, it is conceivable, that the relative orientation angle Ω is determined based on more than two orientations of the geodetic surveying system 1. The different orientations may comprise different inclination directions relative to the vertical direction. By averaging or regression, errors may be reduced. Measurements having a low degree of accuracy, for example measurements at inclination directions, which are almost parallel to a measuring axis of one of the inclinometers, can be excluded or can be weighted with a lower weight value.

Figure 4A:
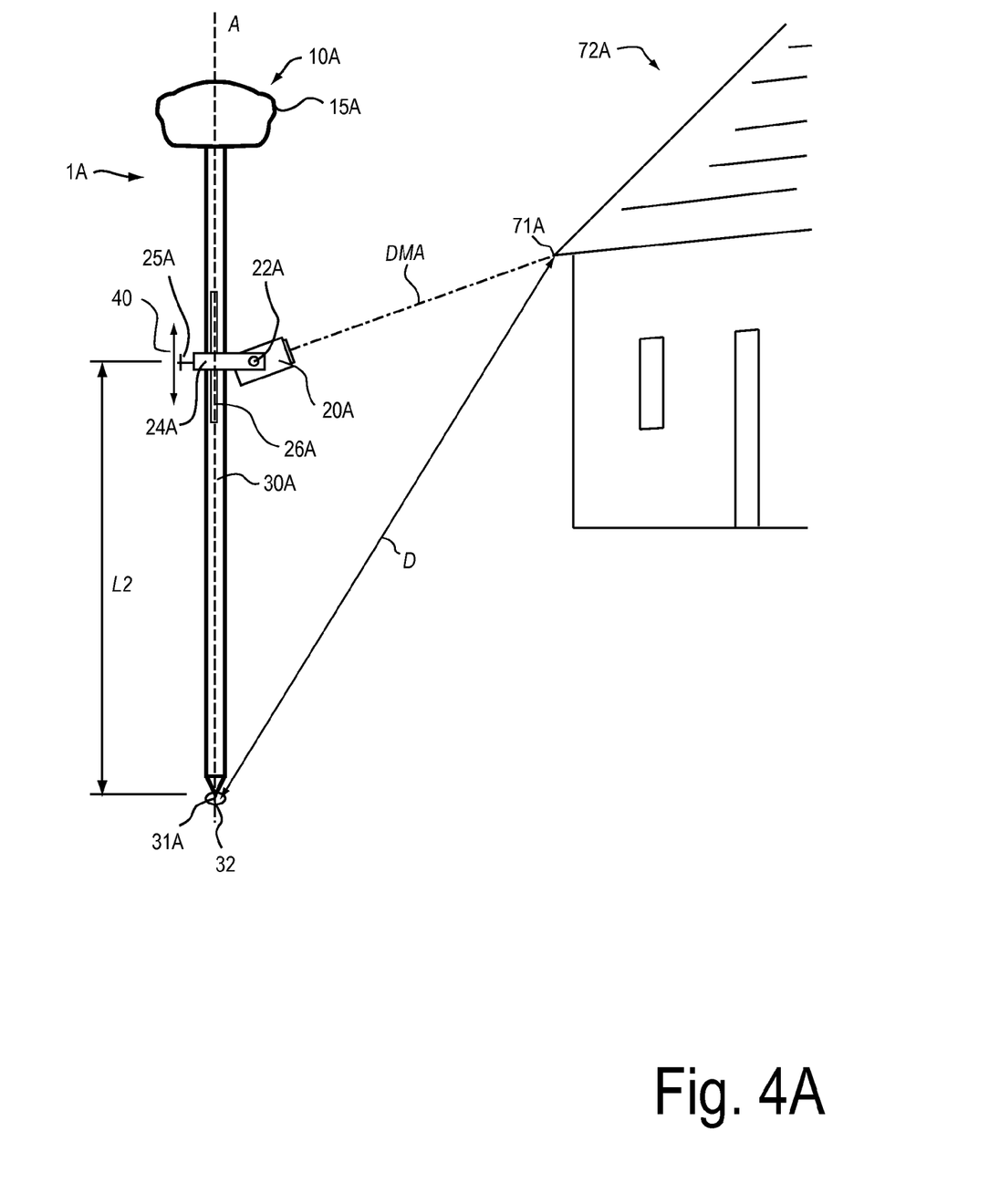
FIG. 4A schematically illustrates a geodetic surveying system according to a second exemplary embodiment.
Figure 4B:
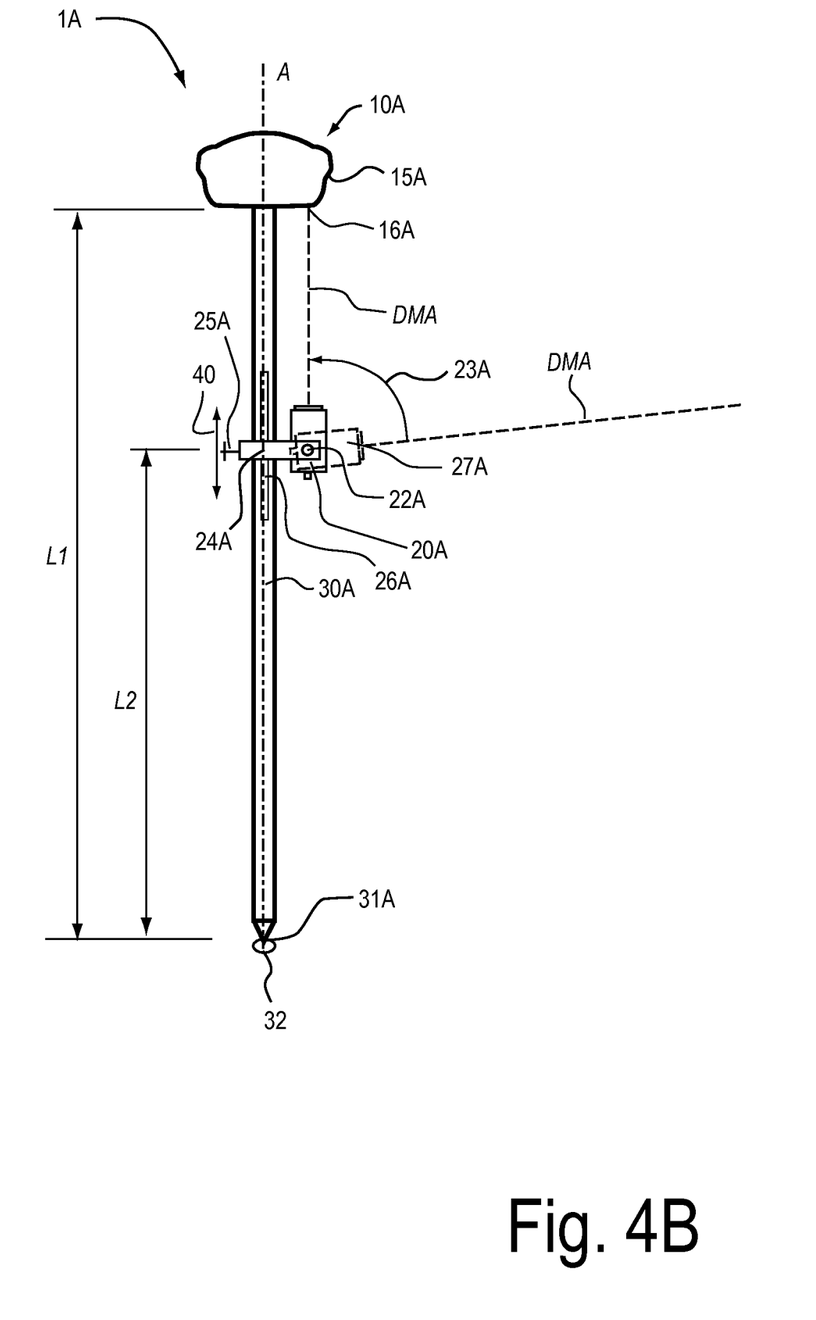
FIG. 4B schematically shows a geodetic surveying system according to the second embodiment, when the measuring position of the distance measuring system is determined.

FIGS. 4A and 4B schematically show a second exemplary embodiment of a geodetic surveying system 1A. Components, which correspond to components of the geodetic surveying system, which is shown in FIG. 1 with regard to the composition or their structure and/or function are generally designated with the same reference numerals, which however have an additional letter added to show differentiation.

As shown in FIG. 4A, the geodetic surveying system 1A comprises a distance measuring system 20A. The distance measuring system 20A may for example be an opto-electronic distance measuring system. The distance measuring system 20A comprises a distance measuring axis DMA, along which the distance measuring system 20A performs a distance measurement. The distance measuring system 20A emits a laser beam along the distance measuring axis DMA. The distance measuring system 20A is further configured such that the distance measuring axis DMA is pointable at a target 71A, which is arranged at a distance from the geodetic surveying system 1A. In the example, which is shown in FIG. 4A, the target 71A is an eave of a house 72A, wherein the distance is measured without a reflector. Alternatively, the target 71A is a reflector, arranged at a pole. The distance measuring axis DMA connects the distance measuring system 20A with the target 71A along a straight line. The straight line continuously extends from the distance measuring system 20A to the target 71A. In other words, the distance measuring axis is neither curved nor angled.

The geodetic surveying system 1A comprises a base component, which comprises the pole 30A and the antenna housing 15A. In the antenna housing 15A, the antenna and the receiver (not shown in FIG. 4A) of the satellite surveying system is arranged.

The distance measuring system 20A is connected to the base component via an articulate connection 22A. The distance measuring system 20A may be configured as a detachable hand-held unit. The distance measuring system 20A may be configured such that it can be connected to the base component at different positions relative to the base component, in particular at different axial positions of the pole 30A. In FIG. 4A, this is indicated with double arrow 40. Thereby, a height L2 of the distance measuring system 20A from the reference point 31A may be unknown after the axial position of the distance measuring system 20A has been changed.

The geodetic surveying system 1A comprises a guide rail system, which comprises a guide rail 26A and a guide carriage 24A. The guide rail 26A is arranged along the pole 30A. The guide carriage 24A is lockable by a screw lock 25A.

The geodetic surveying system 1A comprises an articulate connection 22A. The distance measuring system 20A is connected to the base component via the articulate connection 22A. The articulate connection 22A comprises a swivel axis. Through the articulate connection, the distance measuring system 20A is movable relative to the base component. The geodetic surveying system 1A may be configured such that a distance between the articulate connection 22A and the base component, in particular between a swivel axis of the articulate connection 22A and the base component is constant for all orientations and positions, at which distance measuring system 20A is attachable to the base component. In particular, the distance between the articulate connection and the pole 30A may be constant for all axial positions in relation to the pole 30A. The distance may be a minimal distance between the articulate connection 22A and the base component.

As illustrated in FIG. 4B, the articulate connection 22A is configured such that a distance measuring system 20A is arrangeable such that the distance measuring system 20A connects the distance measuring system 20A with the surface region 16A along a straight line. In other words, the distance measuring axis connects the distance measuring system 20A with the surface region 16A along a straight line, which is neither curved not angled. The distance measuring system 20A may be arranged in this position and orientation by a swivel movement. The swivel movement is schematically indicated by arrow 23A in FIG. 4B.

The surface region 16A is configured as a target surface for the distance measuring system 20A. For example, the surface region 16A may comprise a reflector foil, at which the laser beam of the distance measuring system 20A is reflected. The surface region 16A may comprise a target mark. Thereby, the user can arrange the distance measuring system 20A such that an illumination spot which is caused by the laser beam of the distance measuring system 20A on the surface region 16A is located at a center of the target mark.

The articulate connection 22A comprises one or more swivel joints. The swivel axis, which is shown in FIG. 4B, is oriented horizontally relative to a vertical adjustment of the geodetic surveying system 1A. The distance measuring system 20A may comprise a plurality of a swivel axes, which are configured such that by a swivel movement, the distance measuring axis DMA can be directed away from the target 71A and onto the surface region 16A.

In the position of the distance measuring system 20A, which is shown in FIG. 4B, the distance between the distance measuring system 20A and the surface region 16A is measurable. The measurement position and the measurement orientation of the distance measuring system 20A during a measurement of the distance to the target 71A, which is arranged at distance from the geodetic surveying system 1A, is denoted by reference sign 27A in FIG. 4B.

The distance measuring system 20A may further comprise an inclinometer. The distance measuring system may be configured such that the distance between the distance measuring system 20A and the surface region 16A is determinable depending on the measured inclination of the inclinometer 20A.

The geodetic surveying system 1A is configured such that depending on the measured distance to the surface region 16A, the measurement position 27A relative to the reference point 31A is determinable. Thereby, it is possible to accurately determine the distance D (shown in FIG. 4A) between the survey point 32 and the target 71A. For example, a variation of the position and the orientation of the distance measuring system 20A, which is caused by the directing of the distance measuring axis DMA onto the surface region 16A, may be constant and known. In particular, the distance of the articulate connection from the base component may be constant for all positions and orientations of the distance measuring system 20A relative to the base component.

Thereby, by measuring the distance to the surface region 16A, the measurement position 27A of the distance measuring system 20A relative to the reference point 31A can be determined.

The base component is configured such that the surface region 16A is solidly connected to the reference point 31A. Thereby, the measurement position 27A of the distance measurement system 20A relative to the reference point 31A is determinable with a high accuracy by a distance measurement of the distance measurement system 20A to the surface region 16A.

Measured in a vertical adjustment of the geodetic surveying system 1A, the distance measuring system 20A is arranged at a height L2 from the reference point 31A, which is lower than a height L1 of the surface region 16A from the reference point 31A. Thereby, it is possible to arrange the surface region 16A at a large radial distance from a vertical axis of the geodetic surveying system 1A, without obstructing the view of the user to the reference point 31A and the survey point 32. In the geodetic surveying system 1A, which is shown in FIGS. 4A and 4B, the vertical axis is given by the axis of the pole 30A. The large radial distance of the surface region 16A from the vertical axis further allows a simple design of the articulate connection.

What is claimed is:

1. A geodetic surveying system, comprising:
    a first measurement unit comprising a first housing;
    a second measurement unit comprising a second housing separate from the first housing, wherein the first measurement unit and the second measurement unit are each configured to perform a measurement for acquiring positioning data of the respective measurement unit;
    a first inclinometer disposed in the first housing for acquiring inclination data of the first inclinometer in two axes, which represent a vertical inclination of the first measurement unit; and
    a second inclinometer separate from the first inclinometer, the second inclinometer disposed in the second housing for acquiring inclination data of the second inclinometer in two axes, which represent a vertical inclination of the second measuring unit;
    wherein the geodetic surveying system is configured to determine a relative orientation angle between the first inclinometer and the second inclinometer in a horizontal plane, relative to a vertical adjustment of the geodetic surveying system, using the inclination data of the first inclinometer and the inclination data of the second inclinometer.

2. The geodetic surveying system of claim 1, wherein the geodetic surveying system is further configured to acquire inclination data of the first inclinometer and inclination data of the second inclinometer in a first orientation and in a second orientation of the geodetic surveying system;
    wherein an orientation of the first inclinometer relative to the second inclinometer in the first orientation is identical to an orientation of the first inclinometer relative to the second inclinometer in the second orientation; and
    wherein the geodetic surveying system is further configured to determine the relative orientation angle depending on the inclination data of the first inclinometer in the first orientation and in the second orientation and on the inclination data of the second inclinometer in the first orientation and in the second orientation.

3. The geodetic surveying system of claim 2, wherein the geodetic surveying system is further configured to determine:
    an orientation angle of the first inclinometer in the horizontal plane relative to the vertical adjustment of the geodetic surveying system, depending on a difference between the inclination data of the first inclinometer in the first orientation and the inclination data of the first inclinometer in the second orientation; and
    an orientation angle of the second inclinometer in the horizontal plane, relative to the vertical adjustment of the geodetic surveying system, depending on a difference between the inclination data of the second inclinometer in the first orientation and the inclination data of the second inclinometer in the second orientation.

4. The geodetic surveying system of claim 1, wherein the geodetic surveying system is further configured to determine geodetic coordinates of a remote target depending on the relative orientation angle and further depending on at least one of the positioning data of the first measuring unit and the positioning data of the second measuring unit.

5. The geodetic surveying system of claim 1, wherein the first measuring unit comprises an antenna and a receiver for a global navigation satellite system.

6. The geodetic surveying system of claim 1, wherein the second measuring unit comprises a distance measurement system and the geodetic surveying system further comprises a base component which is connected to the distance measurement system via an articulate connection of the geodetic surveying system;
    wherein the base component comprises:
        a reference point, which is contactable to a survey point; and
        a surface region, which is configured as a target area for the distance measurement system;
    wherein the articulate connection is configured such that the distance measurement system is arrangeable such that in a first position a distance measurement axis is aligned with a remote target and in a second position the distance measurement axis is aligned with the surface region along a straight line;

wherein a position of the distance measurement system relative to the reference point is determinable by a measurement of a distance to the surface region by the distance measurement system.

7. The geodetic surveying system of claim 6, wherein the base component comprises an antenna housing, wherein the antenna housing comprises the surface region.

8. The geodetic surveying system of claim 6, wherein the base component comprises a pole;
wherein the reference point is arranged at a first end of the pole.

9. The geodetic surveying system of claim 6, wherein the distance measurement system is arranged at a height from the reference point, which is lower than a height of the surface region, measured in a vertical adjustment of the geodetic surveying system.

10. The geodetic surveying system of claim 6, wherein the base component comprises an antenna housing, which is arranged at a second end of the pole; wherein the antenna housing comprises the surface region.

11. The geodetic surveying system of claim 1, wherein the second measuring unit comprises a terrestrial surveying instrument.

12. A geodetic surveying system, comprising:
a first inclinometer disposed in a first housing, the first inclinometer having two measuring axes; and
a second inclinometer disposed in a second housing separate from the first housing, the second inclinometer having two measuring axes;
wherein the geodetic surveying system is configured to acquire inclination data of the first inclinometer and inclination data of the second inclinometer in a first orientation and in a second orientation of the geodetic surveying system;
wherein an orientation of the first inclinometer relative to the second inclinometer in the first orientation is identical to an orientation of the first inclinometer relative to the second inclinometer in the second orientation; and
wherein the geodetic surveying system is further configured to determine a relative orientation angle between the first inclinometer and the second inclinometer in a horizontal plane, relative to a vertical adjustment of the geodetic surveying system, using the inclination data of the first inclinometer in the first orientation and in the second orientation and the inclination data of the second inclinometer in the first orientation and in the second orientation.

13. The geodetic surveying system of claim 12, wherein the geodetic surveying system is further configured to determine:
an orientation angle of the first inclinometer in the horizontal plane, relative to the vertical adjustment of the geodetic surveying system, depending on a difference between the inclination data of the first inclinometer in the first orientation and the inclination data of the first inclinometer in the second orientation; and
an orientation angle of the second inclinometer in the horizontal plane, relative to the vertical adjustment of the geodetic surveying system, depending on a difference between the inclination data of the second inclinometer in the first orientation and the inclination data of the second inclinometer in the second orientation. difference between the inclination data of the second inclinometer in the first orientation and the inclination data of the second inclinometer in the second orientation.

14. A method of operating a geodetic surveying system that comprises a first inclinometer disposed in a first housing and a second inclinometer disposed in a second housing separate from the first housing, wherein the method comprises:
positioning the geodetic surveying system including the first housing and the second housing in a first orientation;
acquiring inclination data of the first inclinometer in two axes and the second inclinometer in two axes in the first orientation;
positioning the geodetic surveying system including the first housing and the second housing in a second orientation;
acquiring inclination data of the first inclinometer in two axes and the second inclinometer in two axes in the second orientation, wherein an orientation of the first inclinometer relative to the second inclinometer in the first orientation is identical to an orientation of the first inclinometer relative to the second inclinometer in the second orientation;
determining a relative orientation angle between the first inclinometer and the second inclinometer in a horizontal plane, relative to a vertical adjustment of the geodetic surveying system, using the inclination data of the first inclinometer in the first orientation and in the second orientation and the inclination data of the second inclinometer in the first orientation and the second orientation; and
determining geodetic coordinates of a remote target depending on the relative orientation angle.

15. The method of claim 14, further comprising:
determining at least one of an inclination angle of a measuring plane of the first inclinometer relative to a measuring plane of the second inclinometer, and an inclination direction of the measuring plane of the first inclinometer relative to the measuring plane of the second inclinometer;
wherein at least one of the inclination angle and the inclination direction are determined depending on at least one of the inclination data of the first inclinometer and the second inclinometer in the first orientation, the inclination data of the first inclinometer and second inclinometer in the second orientation, and the relative orientation angle.

16. The method of claim 14, wherein determining the relative orientation angle further comprises:
determining an orientation angle of the first inclinometer in the horizontal plane relative to the vertical adjustment of the geodetic surveying system depending on a difference between the inclination data of the first inclinometer in the first orientation and the inclination data of the first inclinometer in the second orientation; and
determining an orientation angle of the second inclinometer in the horizontal plane relative to the vertical adjustment of the geodetic surveying system depending on a difference between the inclination data of the second inclinometer in the first orientation and the inclination data of the second inclinometer in the second orientation.

17. A non-transitory computer program product comprising computer readable commands, wherein the commands, when loaded into a memory of at least one of a computer and a computer network and executed by at least one of the computer and the computer network cause the at least one of the computer and the computer network to perform the method of claim 14.

18. A geodetic surveying system, comprising:
- a pole having a first end and a second end;
- a distance measurement system coupled to a center portion of the pole via an articulate connection;
- an antenna housing coupled to the first end of the pole, wherein the antenna housing comprises a surface region that is configured as a target area for the distance measurement system; and
- a reference point at the second end of the pole, which is arrangeable at a survey point;
- wherein the articulate connection is configured such that the distance measurement system is arrangeable in a first position where a distance measurement axis of the distance measurement system is aligned with a remote target and in a second position where the distance measurement axis of the distance measurement system is aligned with the surface region of the antenna housing along a straight line;
- wherein in the second position the distance measurement axis is parallel to the pole and the surface region of the antenna housing is perpendicular to the distance measurement axis;
- wherein a position of the distance measurement system on the pole relative to the reference point is determinable by a measurement of a distance to the surface region by the distance measurement system.

* * * * *